June 15, 1971    R. F. SCHNEPPER    3,584,371
METHOD OF FORMING JOINT FLANGE
Filed July 30, 1969
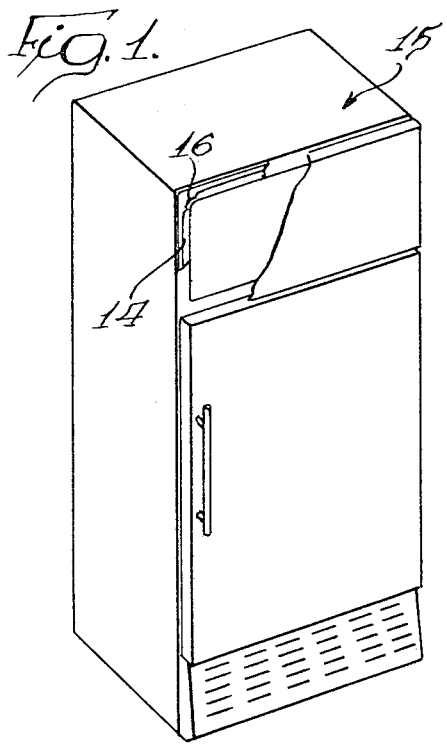
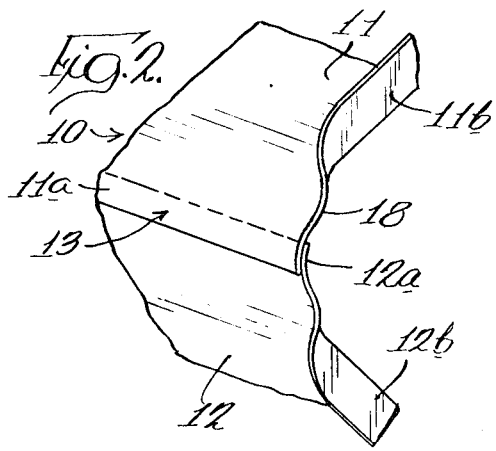
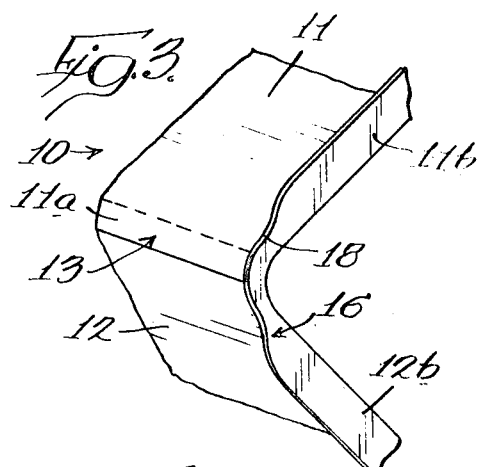
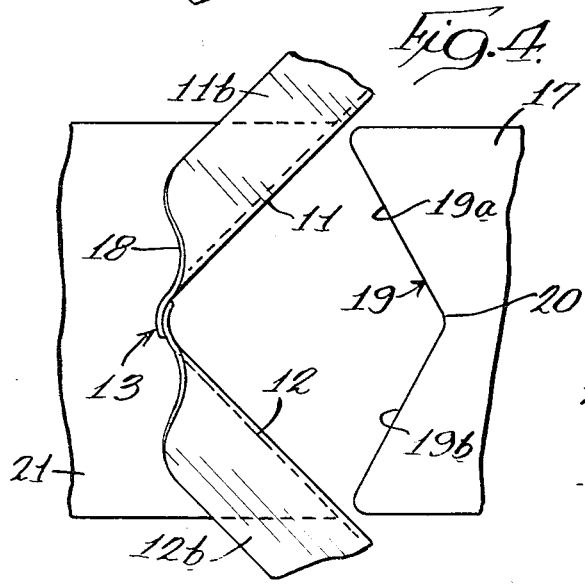
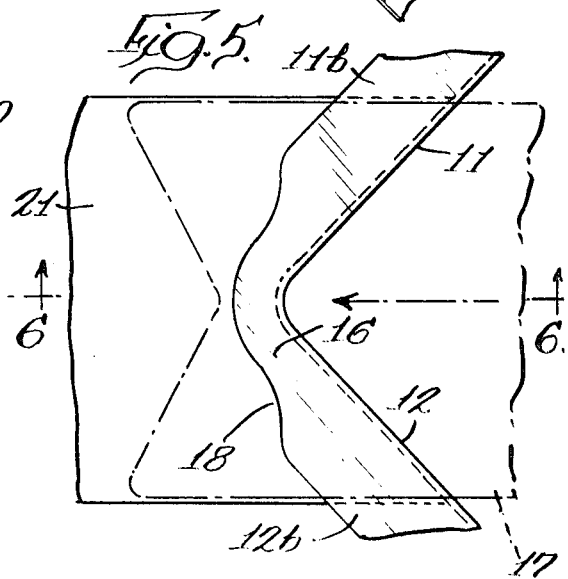
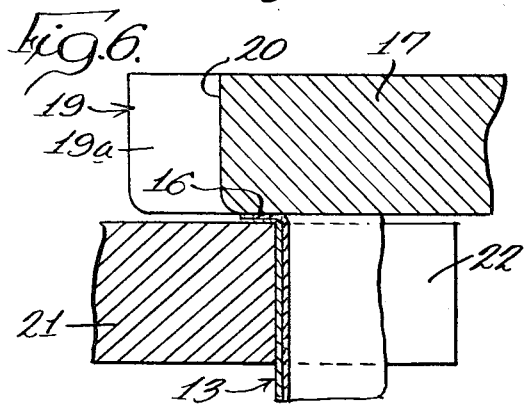
Inventor:
Russel F. Schnepper
By Hofgren, Wegner,
Allen, Stellman & McCord
Atty's United States Patent Office 3,584,371
Patented June 15, 1971

3,584,371
METHOD OF FORMING JOINT FLANGE
Russel F. Schnepper, Boonville, Ind., assignor to Whirlpool Corporation
Filed July 30, 1969, Ser. No. 846,194
Int. Cl. B23k *31/02*
U.S. Cl. 29—480                                 7 Claims

ABSTRACT OF THE DISCLOSURE

A method of forming a reinforced sheet metal corner joint wherein a flange is formed across a welded joint in such a way as to gather the metal toward the joint and effectively preclude splitting of the joint in the formation of the reinforcing flange. The metal is gathered toward the welded joint by means of a V-shaped concave die whereby the edge of the metal sheets is progressively turned as the die surfaces move along the metal edge progressively toward the apex of the die. The sheet metal is firmly held adjacent the edge by suitable clamp means permitting the edge to be turned by the die into accurate perpendicular relationship to the corner joint.

BACKGROUND OF THE INVENTION

Field of the invention

This invention relates to sheet metal working and in particular to the forming of corner sheet metal joints.

Description of the prior art

In one form of reinforced sheet metal corner joint, juxtaposed edges of a pair of metal sheets are welded in lapped association with the sheet metal sheets being turned so as to extend substantially perpendicular to each other. Such a corner joint has been found to be relatively weak against angular displacement of the sheets and, thus, reinforcing means, such as gussets, are conventionally secured to the joint to provide suitable stiffening and reinforcement.

The provision of such gussets is relatively expensive. In replacement thereof, flanges have been formed on the edge of the sheet metal across the welded joint. Such a turned flange provides substantial reinforcement against angular distortion of the corner joint and is relatively inexpensive. However, it has been found that in forming such flanges, the welded seam quite often breaks open, or splits, and thus, rather than a stronger joint, a weaker joint often results.

SUMMARY OF THE INVENTION

The present invention comprehends an improved method of forming a reinforced sheet metal joint wherein a flange is turned in the edge of the sheet metal across the joint. The flange is formed by urging the metal of the edge progressively by a concave die so as to gather the metal toward the welded seam joint and thereby not only prevent splitting of the seam but provide a reinforcement of the seam resulting in a strong reinforced welded joint.

The die may define a concave surface made up of two angularly related planar portions engaging the sheet metal at opposite sides of the welded seam. The die is moved against the sheet metal edge so as to urge the apex of the die toward the welded seam and resultingly bring the die surfaces progressively closer and closer to the welded seam whereby the sheet metal is gathered toward the seam as discussed above.

The sheet metal may be firmly clamped adjacent the edge being turned so as to provide a rigid support during the flange forming operation and provide a backup means for accurately controlling the arrangement of the flange to be perpendicular to the longitudinal extent of the welded seam.

BRIEF DESCRIPTION OF THE DRAWING

Other features and advantages of the invention will be apparent from the following description taken in connection with the accompanying drawing wherein:

FIG. 1 is an isometric view of a refrigerator-freezer appliance with portions broken away to show a reinforced sheet metal corner joint formed by a method embodying the invention;

FIG. 2 is a fragmentary enlarged perspective view of the seam welded metal sheets as during a first step in the forming of a reinforcing flange therein;

FIG. 3 is a fragmentary perspective view of the reinforced corner joint;

FIG. 4 is a plan view showing the relationship of the forming die to the partially formed structure of FIG. 2 at the beginning of the step whereby the turned flange arrangement of FIG. 3 is produced;

FIG. 5 is a plan view similar to that of FIG. 4 but with the forming die arranged as upon completion of the turning of the reinforcing flange; and FIG. 6 is a fragmentary vertical section taken substantially along the line 6—6 of FIG. 5.

DESCRIPTION OF THE PREFERRED EMBODIMENT

In the exemplary embodiment of the invention as disclosed in the drawing, a reinforced sheet metal corner joint generally designated 10 is shown to comprise a pair of metal sheets 11 and 12 jointed along edges 11a and 12a respectively as by seam welding to form a welded joint seam generally designated 13. As best seen in FIG. 2, the sheets 11 and 12 extend substantially perpendicularly to each other whereby the seam 13 defines a right angle turn connecting the two sheets. Illustratively, the corner joint 10 may form a portion of a liner 14 of a refrigeration apparatus illustratively comprising a refrigerator-freezer apparatus.

As indicated above, in such corner joint construction it is desirable to reinforce the joint for improved stiffness and facility of handling as during manufacturing operations including porcelain coating operations and assembly operations. The present invention comprehends forming in the sheets 11 and 12 a turned edge flange generally designated 16 as shown in FIG. 3 which extends across the welded seam 13 substantially perpendicularly thereto. As further indicated briefly above, where such reinforcing flanges have been provided heretofore for connection with such sheet metal corners, splitting of the welded seam 13 often occurs thereby preventing any reinforcement of the corner joint and, in fact, weakening the joint. The present invention comprehends forming the flange 16 by means of an improved die 17 which is arranged to wipe across the edge of the sheets 11 and 12 extending across the corner joint in such a way as to gather the metal toward the seam 13 and thereby effectively preclude splitting of the seam.

In forming the corner joint 10 a turned flange portion 11b and a turned flange portion 12b are formed on the sheets 11 and 12 respectively equally oppositely spaced from the seam 13 as best seen in FIG. 2. As shown the flange portions 11b and 12b may extend substantially perpendicularly to the flat planes of sheets 11 and 12. The sheet edge between portions 11b and 12b may be trimmed, or otherwise formed, to define a recessed edge 18 as shown in FIG. 2.

The edge portion of the sheets defined by edge 18 is then turned to define the flange 16 coplanar with flange portions 11b and 12b as shown in FIG. 3. The turning of flange 16 is effected herein by die 17 which is moved against the edge 18 as illustrated in FIGS. 4 and 5 to progressively engage a concave surface generally designated 19 with the edge 18 so that the portions of surface 19 engaging the edge progressively approach the apex 20 of the surface 19 as the die 17 moves from right to left as seen in FIGS. 4 and 5. In the illustrated embodiment surface 19 includes a pair of planar surface portions 19a and 19b which extend at an obtuse angle to each other to define a V-shaped surface 19. As shown in FIG. 4, the flat planes of sheets 11 and 12 may be substantially perpendicular to each other. As the die 17 moves against edge 18 the flange 16 is formed by the turning over of the sheet metal between flange portions 11b and 12b. During this forming operation the sheet portions 11 and 12 may be clamped securely by a pair of clamp blocks 21 and 22. Clamp block 21 further effectively defines a backup support for the flange 16 limiting the turning thereof to a disposition substantially perpendicular to the seam 13 as shown in FIG. 6. The die wipes across the upper turned surface of flange 16 to accurately complete the formation of the corner flange.

The angular relationship of the die surfaces 19a and 19b to the edge 18 as the die moves toward the seam 13 assures that the metal of flange 16 is prevented from pulling apart at the welded seam 13. It has been found that the movement of the die surfaces may in fact strengthen the seam 13 by gathering the metal at the joint so that an improved reinforced corner joint is obtained.

Upon completion of the formation of flange 16 the corner joint is separated from the clamps 21 and 22 and the die 17 by the simple withdrawal of these elements.

Thus, the liner 14 is provided with improved reinforced corner portions permitting facilitated handling thereof in subsequent manufacturing operations. The formation of the reinforcing flange is extremely simple and economical while yet providing the highly desirable features discussed above.

The foregoing disclosure of specific embodiments is illustrative of the broad inventive concepts comprehended by the invention.

What is claimed is:

1. The method of forming a reinforced sheet metal corner joint comprising the steps of:
    welding a pair of metal sheets along angularly juxtaposed edge portions to define a corner joint; and
    turning one end edge of the corner joint to form a flange substantially perpendicular to the longitudinal extent of the corner joint by successively
        (a) turning the forward edge portion of the sheets at opposite sides of the end edge of the corner joint so as to cause said end edge to define a projection having a maximum height at the seam welded portion and receding back therefrom to said turned forward edge portions, and
        (b) moving a forming die having a recessed portion toward said projection so as to cause the side walls of the recessed portion to progressively turn said projection from adjacent said turned edge portion toward said seam welded portion and resultingly form a reinforcing flange extending across the end of said corner joint.

2. The method of forming a reinforced sheet metal corner joint of claim 1 wherein said die is moved against said projection so as to cause the reinforcing flange to be coplanar with said turned forward edge of the sheets.

3. The method of forming a reinforced sheet metal corner joint of claim 1 wherein said sheets are rigidly held adjacent said end edge and forward edge portions during the progressive turning of said projections.

4. The method of forming a reinforced sheet metal corner joint of claim 1 wherein back-up means are provided rearwardly of said projection and said projection is turned into engagement with said back-up means.

5. The method of forming a reinforced sheet metal corner joint of claim 1 wherein said recessed portion is V-shaped.

6. The method of forming a reinforced sheet metal corner joint comprising the steps of
    seam welding a pair of metal sheets along angularly juxtaposed edge portions to define a corner joint; and turning one end edge of the corner joint to form a flange substantially perpendicular to the longitudinal extent of the corner joint by progressively turning the end edge from positions spaced equally oppositely from the welded seam by means of forces directed angularly toward the welded seam thereby to gather the metal of said end edge toward the welded seam for preventing splitting of the seam at the turned end edge.

7. The method of forming a reinforced sheet metal corner joint of claim 6 including the step of turning the end edge outwardly of said spaced positions prior to said progressive turning by said angularly directed forces.

References Cited
UNITED STATES PATENTS

| | | | |
|---|---|---|---|
| 820,976 | 5/1906 | Katzinger | 72—379 |
| 1,545,021 | 7/1925 | Wells | 29—480 |
| 2,237,535 | 4/1941 | Wahl | 29—480X |
| 2,279,063 | 4/1942 | Rogers | 72—379X |
| 3,168,884 | 2/1965 | Williams | 72—386X |

JOHN F. CAMPBELL, Primary Examiner

R. B. LAZARUS, Assistant Examiner

U.S. Cl. X.R.

29—475; 72—379